Oct. 28, 1924.

J. A. TOMPKINS
WIRE LINE AND ROD COUPLING
Filed March 10, 1923

1,513,199

J. A. Tompkins  INVENTOR

BY Victor J. Evans
ATTORNEY

WITNESSES

Patented Oct. 28, 1924.

1,513,199

UNITED STATES PATENT OFFICE.

JAMES A. TOMPKINS, OF HEALDTON, OKLAHOMA, ASSIGNOR OF ONE-HALF TO FLOYD J. PEEK, OF WIRT, OKLAHOMA.

WIRE LINE AND ROD COUPLING.

Application filed March 10, 1923. Serial No. 624,193.

*To all whom it may concern:*

Be it known that I, JAMES A. TOMPKINS, a citizen of the United States, residing at Healdton, in the county of Carter and State of Oklahoma, have invented new and useful Improvements in Wire Line and Rod Couplings, of which the following is a specification.

This invention relates to coupling devices and has for its object the provision of a novel device for coupling together lengths of line wire cables, rods or the like, and for repairing broken cables and rods such as are used in pumping machinery or drilling rigs in connection with oil or other wells, the device being however capable of use in other capacities in other arts as no restriction as to employment is made.

An important object is the provision of a device of this character which is provided with means for positively gripping the lengths of cable, rod or the like so as to prevent slipping at any time even under the most severe strains.

An additional object is the provision of a device of this character which will be simple and inexpensive to manufacture, easy to assemble, positive in operation, efficient and durable in service and a general improvement in the art.

With the above and other objects and advantages in view the invention consists in the details of construction to be hereinafter more fully described and claimed and illustrated in the accompanying drawings, in which:

Figure 1:
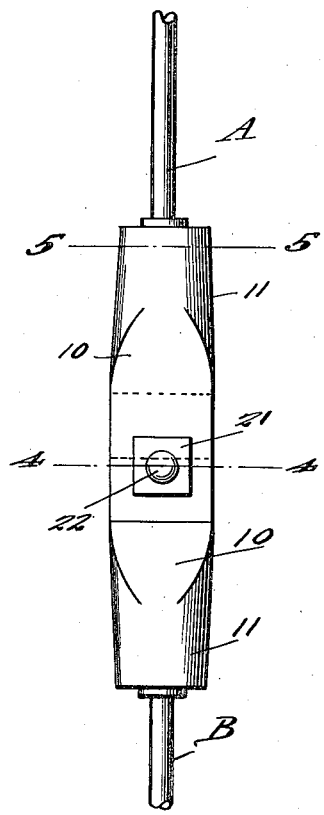
Figure 1 is an elevation of the device.
Figure 2:
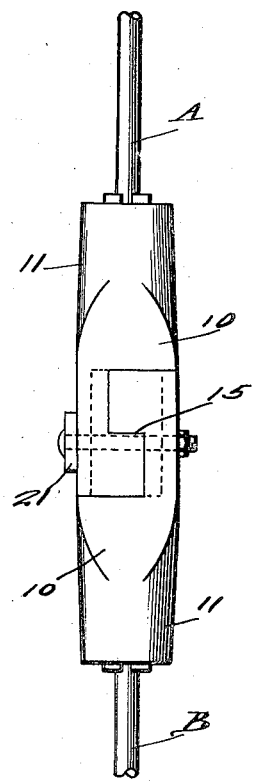
Figure 2 is an elevation at right angles to Figure 1.
Figure 3:
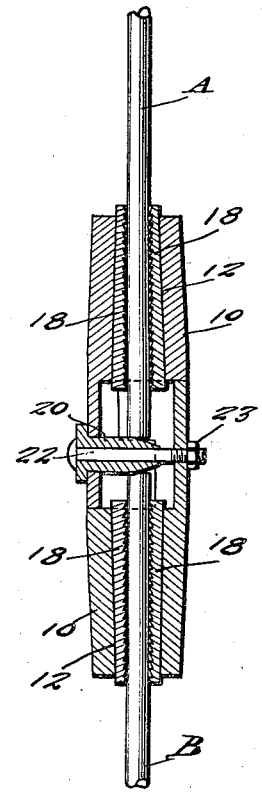
Figure 3 is a longitudinal section.
Figure 6:
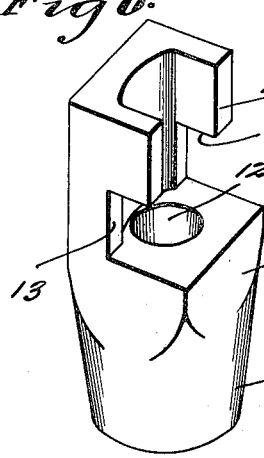
Figure 6 is a perspective view of one member.
Figure 4:
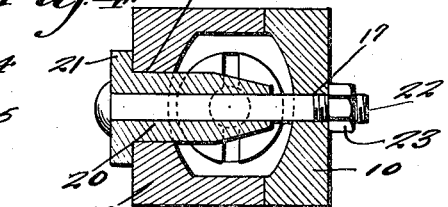
Figure 4 is a cross section through the center.
Figure 8:
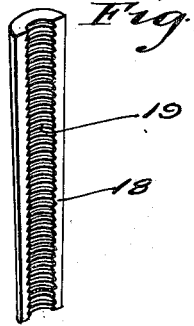
Figure 8 is a perspective view of one of the slips.
Figures 5, 7:
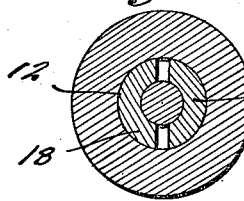
Figure 5 is a cross section near one end.
Figure 7 is a perspective view of the wedge.

Referring more particularly to the drawings I have shown my device as comprising a pair of similar body members 10 which may be described as mating in reversed relation and each of which includes a preferably tapered end portion 11 formed with a tapered bore 12. At substantially its center each body member is cut away to define a recess 13 and an extension 14 which defines a shoulder 15. It should be stated that the bore 12 extends throughout the body member, that is even through the extension 14. It will be observed that the shape of the recess 13 and extension 14 is such that when the two body members 10 are placed together in reversed relation, the extension 14 of each fits within the recess 13 of the other, the shoulders 15 abuttingly engaging as shown in Figure 2. One body member is formed with a rectangular opening 16 intersecting the recess 13 while the other body member is formed with a hole 17 registering therewith.

It is intended that the sections A and B of the rod, cable or the like to be connected be placed within the bores 12, and to effect a proper holding action thereon, I provide within each bore a pair, or more, of slips 18 which are tapered throughout their length for wedging engagement within the bores, and which have their inner surfaces serrated as indicated at 19 for exerting a biting action on the rods or cables.

The numeral 20 represents a wedge block which is inserted through the opening 16 and which is wedge shaped for engagement with the inner ends of the rods or cables for the purpose of forcing them outwardly in gripped relation by the slips within the bores. The outer end of this wedging block is provided with a head 21 which prevents it from slipping too far into the device and passing through the wedge block is a bolt 22 which passes through the hole 17 and which carries an ordinary nut 23.

In assembling the device, the sections A and B of the rod or the like are placed within the bores 12 and the slips 18 are inserted into the bores in embracing relation to the sections, prior to the connection of the body members 10 with each other. The body members are then placed together with their extensions 14 fitting within the recesses 13, the wedge block 20 is forced through the opening 16, the bolt 22 is passed through the wedge block and hole 17, and the nut 23 is applied and screwed down. Initially the inner ends of the rod or cable sections A and B will be comparatively close together so that when the wedge block 20 is inserted, the inclined sides thereof will engage the ends of the sections. When the nut 23 is tightened the result is to draw the wedge block transversely through the recesses in the body members and force the rod sections, together with the slips, outwardly. Owing to the fact that the slips are tapered and that the bores are also tapered, it is obvious that the slips will firmly engage the sections and prevent slipping thereof outwardly while the wedge member prevents the sections from moving inwardly. The bolt 22 also serves to hold the two body members 10 together so that dislocation of any of the parts will be absolutely prevented.

From the foregoing description and a study of the drawings it will be apparent that I have thus provided a simply constructed, inexpensive and yet most highly efficient connector of the class described which will have the maximum strength and durability and which is not likely to get out of order.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. Means for connecting rod sections comprising a pair of similar body members each formed with a tapered bore and each having one end recessed to define an extension, one member being formed with a transverse opening leading into the recess and the other being formed with a hole leading into the recess and designed to register with said opening when said members are assembled with the extension of each fitting within the recess of the other, the rod sections being adapted to be inserted within said bores, a wedge block insertable through said opening and engaging the inner ends of the rod sections for forcing them outwardly, and a bolt passing through the wedge member and through said hole for effecting movement of the wedge member and for clamping said members together.

2. Means for connecting rod sections comprising a pair of similar body members each formed with a tapered bore and each having one end recessed to define an extension, one member being formed with a transverse opening leading into the recess and the other being formed with a hole leading into the recess and designed to register with said opening when said members are assembled with the extension of each fitting within the recess of the other, the rod sections being adapted to be inserted within said bores, and bolt operated wedging means for engaging the inner ends of the sections and forcing them outwardly.

3. Means for connecting rod sections comprising a pair of similar body members detachably connected and each formed with a tapered bore, one member having an opening therein and the other being formed with a hole registering with said opening, the rod sections being adapted to be inserted within said bores, split tapered slits within said bores and engaging said rod sections, a wedge member extending through said opening, and engaging the adjacent end of said rod sections, and a bolt passing through the wedge member and through said hole and equipped with an adjusting nut whereby to move the wedge member longitudinally to force the said rod sections outwardly.

In testimony whereof I affix my signature.

JAMES A. TOMPKINS.